June 28, 1960 B. T. BARBER 2,943,303
VISUAL INDICATING SIGNAL MONITORING SYSTEM
Filed Aug. 1, 1955

INVENTOR
BASIL T. BARBER
BY
ATTORNEY

ވ2,943,303

Patented June 28, 1960

2,943,303

VISUAL INDICATING SIGNAL MONITORING SYSTEM

Basil T. Barber, Halesite, N.Y., assignor to Sperry Rand Corporation, a corporation of Delaware Filed Aug. 1, 1955, Ser. No. 525,438

1 Claim. (Cl. 340—213)

This invention relates to signal monitoring systems of the visual indicating type. More particularly, the invention concerns a novel system for causing an indicating light to flash periodically when an electrical signal input to the system exceeds a preselected magnitude.

A visual alarm system for indicating an excessive electrical signal is often desirable, for example, in electrically-controlled servomechanisms, since an excessive signal may be the result of a malfunction which should be detected without delay. An excessive signal may also be indicative of those periods, following the introduction of a command signal to a slowly responsive servomechanism, when the controlled object lags considerably behind the controller. The signal usually monitored in electrically-controlled servomechanisms is the so-called "error" signal, i.e., the signal that results from the differential combination of primary control and position feedback signals. In a servomechanism having good response characteristics, the error signal is normally small, since the controlled object closely follows the movements of the controller. However, if a malfunction occurs in the servomechanism, say a failure of the main amplifier, or if for any other reason the controlled object ceases to closely follow the controller, the error signal grows in magnitude beyond its normal value.

Visual alarm systems responsive to excessive servomechanism error signals have heretofore generally been one or the other of the electromagnetic relay type and the electronic tuning eye type. In the first case, speed of response and reliability are likely to suffer; while in the second case, the visual indication presented is prone to misinterpretation and ambiguity.

In the present system, an electrical signal to be monitored and a reference electrical signal are adapted to jointly control a switching element for periodically switching an indicating lamp on under certain conditions. Both signals have recurrent peak magnitudes of a given polarity spaced apart by equal time intervals of respectively different duration. When a given polarity peak of one signal is in time coincidence with a given polarity peak of the other signal, the switching element is operated to place the reference signal across the lamp to light the same, but only when the given polarity peak of the monitored signal also exceeds a predetermined magnitude. The lamp is automatically extinguished when the reference signal diminishes a given amount below its peak magnitude. Thus, when the monitored signal becomes excessive, the indicating lamp flashes at a recurrence frequency dependent upon the relationship of the durations of the peak-to-peak time intervals of the respective signals. Hence, as will hereinafter be developed in detail, if one signal, for example, has a 400 c.p.s. carrier and the other a 60 c.p.s. carrier, the flicker frequency of the lamp is 20 c.p.s.

An object of the present invention is to provide an improved visual indicating system wherein an indicating lamp is caused to flash periodically when an electrical signal input to the system exceeds a predetermined magnitude.

Another object is the provision of a system of long life, high sensitivity, and high input impedance for visually, unambiguously, and rapidly indicating excessive signal inputs thereto.

Another object is to provide a plurality of indicating systems, each according to the foregoing objects, in a novel arrangement for monitoring a plurality of electrical signals individually and in combination.

With the foregoing and other objects in view, the present invention includes the novel combinations and elements described below and illustrated in the accompanying drawings, wherein, Fig. 1 is a schematic circuit diagram of a preferred form of visual indicator arrangement according to the invention;

Figure 1:
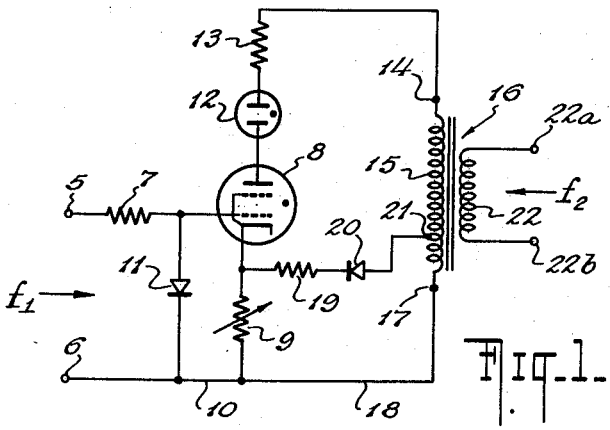

Referring to Fig. 1, the signal to be monitored is introduced across a pair of terminals 5, 6. If the signal is alternating, it has a frequency $f_1$, and if it is a pulsating D.C., it has a ripple frequency $f_1$ with terminal 5 serving as the positive terminal thereof. Terminal 5 is connected via a coupling resistor 7 to the control grid of a thyratron tube 8 employed as a switching element. The cathode of thyratron 8 is connected via an adjustable biasing resistor 9 to a lead 10 connected to terminal 6. A voltage limiting device, which may, for example, comprise a crystal diode 11, is connected from the control grid of thyratron 8 to lead 10.

When the positive peaks of the voltage across terminals 5, 6 exceed a predetermined magnitude less than their maximum magnitude, for which event a visual alarm is desired, the positive peaks of the voltage applied to the control grid of thyratron 8 stay at a constant value notwithstanding a subsequent increase of the terminal voltage to the maximum magnitude of its peaks. Crystal diode 11 is capable of producing this result, since its internal resistance decreases substantially linearly with increases in the voltage applied thereto over a given range. The polarization of the diode 11, of course, must be such that the diode only conducts when the control grid of thyratron 8 is positive.

The plate of thyratron 8 is connected to one electrode of a glow tube, preferably a neon lamp 12, the other electrode of which is connected via a dropping resistor 13 to one end terminal 14 of the secondary winding 15 of a transformer 16. The other end terminal 17 of secondary winding 15 is connected via a lead 18 to the common connection of adjustable resistor 9 and lead 10. The end of adjustable resistor 9 connected to the cathode of thyratron 8 is also connected via a series connection of a dropping resistor 19 and a rectifying element 20 to a tap 21 on secondary winding 15 intermediate the end terminals 14, 17.

The primary winding 22 of transformer 16 is supplied from a reference source across a pair of terminals 22a, 22b with an alternating current having a constant frequency $f_2$ and a constant peak amplitude.

According to the present invention, thyratron 8 will fire and glow tube 12 will glow when the positive peaks of the signal having frequency $f_1$ coincide with the positive peaks of the signal having frequency $f_2$, and then only when the positive peaks of the signal having frequency $f_1$ exceed the predetermined magnitude thereof.

Figure 2:
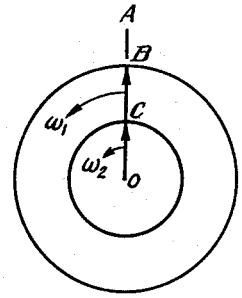
Fig. 2 is a vector diagram for analyzing the operation of the arrangement of Fig. 1.

The frequency of recurrence of positive peak coincidence depends on the numerical relation of the frequencies $f_1$ and $f_2$, the vectors of which revolve at angular velocities of $\omega_1$ and $\omega_2$, respectively. The $\omega_1$ vector is depicted as OB in Fig. 2, while the $\omega_2$ vector is depicted as OC. If the two vectors are to coincide along the line OA, then the following relationship must exist:

$$\frac{\omega_2}{\omega_1} = \frac{n_1}{n_2} \tag{1}$$

where $n_1$ and $n_2$ are integers. Assuming for illustrative purposes that $f_1$ is the standard carrier frequency of 60 c.p.s. and $f_2$ is the standard carrier frequency of 400 c.p.s., the minimum integers for the above relationship (1) would be $n_1=20$ and $n_2=3$. Thus, the respective peaks of the $f_1$ and $f_2$ signals would be in coincidence at a recurrence frequency $f_r$ as follows:

$$f_r = \frac{f_1}{n_2} = \frac{f_2}{n_1} = 20 \text{ times per second} \tag{2}$$

By means of cathode resistor 9, resistor 19, rectifying element 20 and the connection of these elements across tap 21 and end terminal 17 of the transformer's secondary winding 15, a unidirectional bias is produced on the cathode of thyratron 8. Rectifying element 20 is polarized so that the bias is positive, and resistor 9 is adjustable so that the bias may be adjusted, thereby to set the magnitude of the positive peak voltage required on the control grid to fire the thyratron 8 when the positive peaks of the $f_1$ and $f_2$ signals coincide. Accordingly, resistor 9 is adjusted so that thyratron 8, hence glow tube 12, will fire when the predetermined magnitude of the $f_1$ signal peaks is exceeded and when such peaks are also coincident with those of the $f_2$ signal. Since the voltage required to sustain the glow of a glow tube is somewhat less than that required to fire the same, glow tube 12 is extinguished when the $f_2$ signal diminishes a given amount from its positive peak magnitude.

Again, assuming for illustrative purposes that the signal frequencies employed are 60 c.p.s. and 400 c.p.s., then the flicker frequency of glow tube 12 will be 20 times per second. Many other suitable frequency combinations, however, may be readily employed to give the same or other flicker frequencies, and it is immaterial in any instance which frequency of the particular combination employed is selected for the $f_1$ signal and which is selected for the $f_2$ signal. For example, if $f_1$ is 50 c.p.s. and $f_2$ is 120 c.p.s., or vice versa, the flicker frequency derived from Equations 1 and 2 will in either case be 10 times per second.

Figure 3:
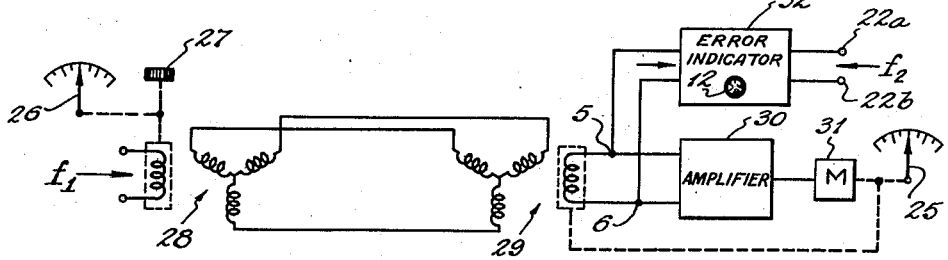
Fig. 3 is a schematic diagram of a positional servomechanism incorporating the arrangement of Fig. 1.

The arrangement depicted in Fig. 3 serves to illustrate how the system of Fig. 1 may be embodied in a servomechanism to provide a visual indication of large error by means of the flickering of glow tube 12. The servomechanism shown is employed to position a controlled object depicted as a pointer 25 so that it maintains a given positional relationship with a remotely-located pointer 26 which is actuated by a controller element depicted as a knob 27.

The rotor of a synchro generator 28, energized by the $f_1$ signal, is mechanically coupled to pointer 26 and knob 27 so as to be angularly displaced in accordance with their actuation. The stator of generator 28 is connected back-to-back with the stator of a synchro control transformer 29, the rotor of which is electrically connected to the input circuit of an amplifier 30. A motor 31, energized in accordance with the output of amplifier 30, is mechanically coupled to drive pointer 25 and simultaneously to drive the rotor of control transformer 29 in a follow-up manner. By this arrangement, motor 31 will drive pointer 25 to reduce the signal input to amplifier 30 to zero, whereupon pointer 25 will have its given positional relationship with pointer 26.

The signal input to amplifier 30 is generally termed the error signal, since it actually represents the position error of the controlled object. Hence, if the response of the servomechanism is slow, the error signal will be large until the positioning of pointer 25 catches up with the positioning of pointer 26. Moreover, if a malfunction develops, such as a failure of amplifier 30, motor 31, or the driven parts, the error signal will again be large, since such malfunction will prevent the positioning of pointer 25 and the accompanying follow-up driving of the rotor of control transformer 29. In either event, the system of Fig. 1, represented in Fig. 3 as the error indicator block 32, may be employed to provide its characteristic visual indication. To this end, the grid-cathode terminals 5, 6 are connected across the rotor leads of control transformer 29 so as to receive the servomechanism's error signal, which is at frequency $f_1$. The reference signal at frequency $f_2$ is supplied to block 32 via terminals 22a, 22b. Thus, when the servomechanism's error signal exceeds a predetermined magnitude, glow tube 12 flickers its visual indication of this occurrence at a flicker frequency dependent upon the numerical relationship of frequencies $f_1$ and $f_2$.

Figure 4:
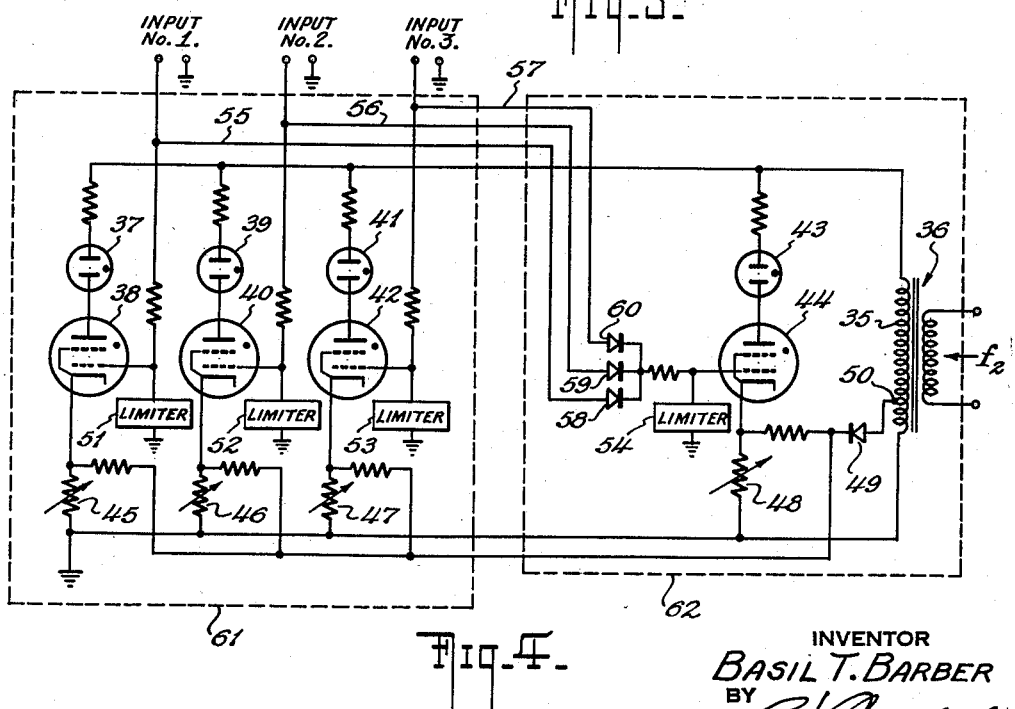
Fig. 4 is a schematic circuit diagram showing the arrangement of Fig. 1 employed in plural numbers for monitoring a plurality of electrical signals individually and in combination.

Two or more signals having synchronously recurrent variable value peak magnitudes of a given polarity spaced apart by equal time intervals of a given duration may be monitored both individually and in combination according to the present invention. An arrangement for accomplishing this is depicted in Fig. 4 wherein three such signals to be monitored having a frequency $f_1$ are designated as input No. 1, input No. 2, and input No. 3. Each of the inputs for monitoring is fed to its own error indicator, and also fed to a common error indicator, i.e., a master error indicator that receives all of the inputs for monitoring.

The individual error indicators and the common error indicator are each identical to the system of Fig. 1, except that they all receive their $f_2$ signal input and their cathode biasing potential from a common source. In this regard, the secondary winding 35 of a transformer 36 energized by the $f_2$ signal and corresponding to transformer 16 (Fig. 1) is connected across a glow tube 37 in series with a thyratron tube 38, a glow tube 39 in series with a thyratron tube 40, a glow tube 41 in series with a thyratron tube 42, and a glow tube 43 in series with a thyratron tube 44. The individual error indicator for input No. 1 comprises the tubes 37, 38. The individual error indicators for inputs No. 2 and No. 3, respectively, comprise the tubes 39, 40 and 41, 42. The common error indicator comprises the tubes 43, 44.

The adjustable cathode biasing resistors for thyratrons 38, 40, 42 and 44 are adjustable resistors 45, 46, 47 and 48, respectively, all of which are in circuit with a common rectifying element 49 connected to an intermediate secondary tap 50 corresponding, respectively, to rectifying element 20 and tap 21 of Fig. 1. The limiters corresponding to limiter 11 of Fig. 1 are designated as limiters 51–54 for the respective error indicators.

Input No. 1 is fed to the common error indicator via a lead 55 coupled to the connection of this input to its individual error indicator. Leads 56 and 57 are correspondingly coupled to the individual error indicators for inputs No. 2 and No. 3 for feeding such inputs to the common error indicator. Rectifying elements 58–60, respectively, are placed in leads 55–57 and polarized so as to prevent interaction of the inputs insofar as the individual error indicators are concerned.

Each of the error indicators of Fig. 4 functions exactly as the system depicted in Fig. 1. Therefore, glow tube 37 will flicker if input No. 1 exceeds a predetermined peak magnitude, as will glow tubes 39 and 41 if inputs No. 2 and No. 3, respectively, exceed a predetermined peak magnitude. Glow tube 43, however, will flicker when one or more of inputs No. 1–3 are excessive. Thus, the individual error indicators may be grouped as a local monitoring unit 61 for servomechanisms located, for example, in the forward torpedo room of a submarine, while the common error indicator, to pursue the example further, may be remotely located as a master monitoring unit 62 in the control room of the submarine.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

A system for providing an intermittent visual indication when a first alternating signal of variable amplitude exceeds a given value thereof providing the positive peaks of said first signal coincide with those of a second alternating signal having a fixed amplitude, said system comprising a thyratron tube having a control grid and a cathode, a first source of variable amplitude alternating signal having a first predetermined frequency, means for connecting said first signal source to the control grid of said thyratron, signal limiting means connected to the control grid of said thyratron for preventing said first signal from exceeding a predetermined amplitude by more than a given limited amount as applied to said grid, a glow tube, a second source of fixed amplitude alternating signal having a second predetermined frequency, means for connecting said second signal source in series with said thyratron and glow tubes, and means including rectifying means connected between said second signal source and the cathode of said thyratron for applying a portion of said second signal to the cathode of said thyratron for positively biasing said thyratron, said first and second signals being respectively of substantially different frequencies so that their positive peaks coincide at a frequency of recurrence numerically less than each of the individual frequencies of said first and second signals to provide an intermittent visual indication, said second signal being connected across said glow tube when a first signal peak of a given polarity exceeds a predetermined amplitude and is in time coincidence with a second signal peak of the same polarity and when the amplitude of said second signal diminishes a given amount from its coincident peak amplitude the connection across said glow tube is opened causing said glow tube to flash periodically.

References Cited in the file of this patent

UNITED STATES PATENTS

| 2,273,978 | Montgomery | Feb. 24, 1942 |
| 2,518,380 | Rowe et al. | Aug. 8, 1950 |
| 2,634,385 | Martin | Apr. 7, 1953 |
| 2,691,158 | Wittenberg | Oct. 5, 1954 |
| 2,698,392 | Herman | Dec. 28, 1954 |